(12) United States Patent
Vigneswaran et al.

(10) Patent No.: US 11,553,351 B2
(45) Date of Patent: Jan. 10, 2023

(54) SECURE INDOOR POSITIONING DEVICE, SYSTEM AND METHOD

(71) Applicant: u-blox AG, Thalwil (CH)

(72) Inventors: Hariharasudhan Vigneswaran, Lund (SE); Peter Karlsson, Lund (SE)

(73) Assignee: u-blox AG, Thalwil (CH)

( * ) Notice: Subject to any disclaimer, the term of this patent is extended or adjusted under 35 U.S.C. 154(b) by 211 days.

(21) Appl. No.: 17/116,955

(22) Filed: Dec. 9, 2020

(65) Prior Publication Data
US 2022/0182839 A1    Jun. 9, 2022

(51) Int. Cl.
| H04L 9/32 | (2006.01) |
|---|---|
| H04W 4/80 | (2018.01) |
| H04W 12/63 | (2021.01) |
| H04W 4/33 | (2018.01) |
| H04W 76/10 | (2018.01) |

(Continued)

(52) U.S. Cl.
CPC ............. *H04W 12/63* (2021.01); *H04W 4/33* (2018.02); *H04W 4/80* (2018.02); *H04W 12/037* (2021.01); *H04W 12/069* (2021.01); *H04W 12/106* (2021.01); *H04W 64/00* (2013.01); *H04W 76/10* (2018.02)

(58) Field of Classification Search
CPC ......... H04W 12/63; H04W 4/33; H04W 4/80; H04W 76/10; H04W 12/106; H04W 12/037; H04W 12/069; H04W 64/00
USPC ........................................................ 713/170
See application file for complete search history.

(56) References Cited

U.S. PATENT DOCUMENTS

| 7,523,490 B2 * | 4/2009 | Guo .................... H04L 63/0807 |
|---|---|---|
| | | 713/168 |
| 2009/0309790 A1 * | 12/2009 | Farmer ................. G01S 19/256 |
| | | 375/147 |

(Continued)

FOREIGN PATENT DOCUMENTS

| CN | 101137215 B | * | 5/2010 |
|---|---|---|---|
| CN | 109995530 A | * | 7/2019 |

(Continued)

OTHER PUBLICATIONS

Dädeby, et al., "A system for indoor positioning using ultra-wideband technology," 2017, pp. i-60, Dept. of Comp. Sci. and Eng., Chalmers Univ. of Technology, Univ. of Gothenburg, Sweden.

(Continued)

*Primary Examiner* — Haresh N Patel (74) *Attorney, Agent, or Firm* — Fish & Richardson P.C.

(57) ABSTRACT

A secure indoor positioning device, system and method. A mobile electronic device is detected entering into proximity of a stationary electronic device. In response, a plurality of secure session parameters is negotiated via two-way wireless communication between the stationary electronic device and the mobile electronic device. One or more of the negotiated plurality of secure session parameters is communicated to one or more other stationary electronic devices. At one or more of the plurality of stationary electronic devices, secure messages broadcasted by the mobile electronic device are received. These messages are decrypted or (Continued)

authenticated using one or more of the negotiated secure session parameters and are used to determine a position of the mobile electronic device.

24 Claims, 5 Drawing Sheets

(51) Int. Cl.
*H04W 12/106* (2021.01)
*H04W 12/037* (2021.01)
*H04W 12/069* (2021.01)
*H04W 64/00* (2009.01)

(56) References Cited

U.S. PATENT DOCUMENTS

| | | | |
|---|---|---|---|
| 2010/0013701 A1* | 1/2010 | Fischer | G01S 19/03 342/357.43 |
| 2012/0077432 A1 | 3/2012 | Rose et al. | |
| 2013/0136265 A1 | 5/2013 | Pinder | |
| 2017/0013450 A1 | 1/2017 | Ziv et al. | |

FOREIGN PATENT DOCUMENTS

| | | | |
|---|---|---|---|
| CN | 110460438 A | * | 11/2019 |
| CN | 111092717 A | * | 5/2020 |
| CN | 111698238 A | * | 9/2020 |

OTHER PUBLICATIONS

Donaubauer, "White Paper—Indoor Positioning & Services," 2019, pp. 1-38, Infsoft GmbH, Großmehring, Germany.
"Google Beacon Platform—Eddystone Ephemeral Identifier," accessed Jul. 20, 2020, pp. 1-3, Google Developers.
Smolarek, "How to secure your beacons from being spoofed," Oct. 30, 2018, pp. 1-7, Matchmore Blog.
Bormann, et al., "Terminology for Constrained-Node Networks," May 2014, Internet Engineering Task Force (IETF) p. 1.
Bai et al., "Overview of RFID-Based Indoor Positioning Technology," Geospatial Science Research 2, RMIT University, Dec. 2012, 10 pages.
EP Extended Search Report in European Appln. No. 21205254.2, dated Mar. 31, 2022, 9 pages.

* cited by examiner

SECURE INDOOR POSITIONING DEVICE, SYSTEM AND METHOD

BACKGROUND OF THE INVENTION

The present invention relates to the field of indoor positioning techniques and, more particularly, to secure indoor positioning devices, systems and methods.

Satellite navigation systems do not generally function well inside buildings and other structures due to blocking of the satellite signals by the building or structure. Indoor positioning is a collective name for techniques used to navigate, track and identify things or people in indoor settings. A typical indoor positioning system can include a mobile device (which may also be referred to as a "tag") whose position is to be tracked. The tag can be attached to an object whose location is to be tracked or the tag can be carried by a person whose location is to be tracked. The tag broadcasts a wireless signal which is received by "anchor points." These broadcasted signals, in combination with known locations of the anchor points, are used to determine the location of the tag as it moves within the building or other structure.

Some conventional indoor navigation systems have weak security and/or privacy protection. For example, a conventional indoor navigation system can be susceptible to spoofing, in which a malicious entity mimics a legitimate tag by replaying messages in order to access sensitive information or to interfere with operation of the system.

In some indoor positioning use-cases, however, security and/or privacy can be important. Examples include tracking locations of high value tools or equipment and tracking locations of persons. What is needed, therefore, is indoor positioning systems and methods having improved security.

SUMMARY OF THE INVENTION

The present invention provides a secure indoor positioning device, system and method. In accordance with an embodiment, a mobile electronic device is detected entering into proximity of a stationary electronic device. In response to detection of the mobile electronic device, a plurality of secure session parameters is negotiated via two-way wireless communication between the stationary electronic device and the mobile electronic device. This negotiation is preferably performed using a light-weight key negotiation protocol. One or more of the negotiated plurality of secure session parameters is communicated to one or more other stationary electronic devices. The stationary electronic device and the one or more other stationary electronic devices are collectively a plurality of stationary electronic devices. At one or more of the plurality of stationary electronic devices, secure messages broadcasted by the mobile electronic device are received. These messages are decrypted or authenticated using one or more of the negotiated secure session parameters and are used to determine a position of the mobile electronic device. These and other aspects of the present invention are described in more detail herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT OF THE INVENTION

The present invention allows a mobile electronic device, also referred to as a tag, to be configured in a secure manner so that messages broadcasted by the mobile electronic device are also secure. The broadcasted messages (also referred to as positioning messages) can be used for determining an indoor position of the mobile electronic device. The present invention inhibits spoofing of broadcast messages and also protects privacy of the broadcast messages.

In an embodiment, the mobile electronic device is able to move freely from one indoor area to another and is reconfigured automatically upon entry into each indoor area so that tracking of the mobile electronic device can continue seamlessly from one indoor area to another.

Configuration of the mobile electronic device establishes a secure communication session. The secure communication session is established (e.g., in a configuration mode of the mobile electronic device) before the mobile electronic device broadcasts secure positioning messages (e.g., in a broadcast mode of mobile electronic device). Therefore, the mobile electronic device preferably uses a connection-oriented communication protocol, which means that a communication session (which may also be referred to as a semi-permanent connection) is established before the device communicates the secure broadcast messages.

In an embodiment, this configuration of the mobile electronic device occurs automatically upon detection of the mobile electronic device. This detection occurs upon the mobile electronic device entering into the vicinity of an appropriately-configured stationary electronic device, also referred to as a master anchor point (MAP).

The MAP is an anchor point that can establish a communication session with a tag and configure the tag, while other anchor points can also be present in the area. These other anchor points function to receive secure broadcast messages from the mobile electronic device. These messages are used for tracking the location of the mobile electronic device as it moves about within the area. These other anchor points, however, do not necessarily participate in configuring the mobile electronic device to establish the secure session.

The anchor points, including the MAPs, are referred to as being "stationary." This means that these devices are essentially in fixed positions with respect to the mobile electronic device while they are receiving broadcast messages from the mobile electronic device. Accordingly, the anchor points do not necessarily need to be permanently immobile and instead can be moved around at other times, as needed. Moreover, the anchor points can be mounted to a movable platform, such as a watercraft, while still maintaining a fixed position with respect to a tag which moves about with respect to the platform.

The MAP and mobile electronic device can communicate and negotiate keys using enhanced public key infrastructure (PKI) techniques. More particularly, the mobile electronic device and the MAP can be preconfigured with their corresponding private keys, PKI certificates and a common trusted certificate. This pre-configuration can be performed using out-of-band communications (i.e. using communication methods other than that which is used for establishing the secure communication session). The common certificate can be obtained from a certificate authority (CA).

In an alternative embodiment, rather than PKI, a pre-shared key (PSK) protocol can be used. In the PSK case, the tag and MAP are pre-configured with a shared symmetric key. Whereas, in the PKI case, the tag and MAP are each pre-configured with an asymmetric private key along with the certificates and CA.

Using PKI is preferred to pre-sharing of security keys because of the forward secrecy PKI provides. More particularly, if a key negotiated using PKI is hacked, then only information for one session is compromised.

When a mobile electronic device enters into a new indoor area, it will typically be in a configuration phase. For example, the device may be incorporated into a global navigation satellite system (GNSS) receiver which stops receiving satellite signals; this may indicate that the device has entered an indoor area and so the device enters the configuration phase. In the configuration phase, the mobile electronic device can perform an asymmetric key negotiation with a MAP using a light weight public key infrastructure (PKI) communication security protocol. Examples of suitable light weight PKI protocols include, but are not limited to, compressed transport layer security (cTLS) protocols, ephemeral Diffie-Hellman over COSE (EDHOC) protocols, and so forth. Techniques such as concise binary object representation (CBOR) certificates along with cTLS compression can also be used by the mobile electronic device and MAP so that the key negotiation is both bandwidth and power efficient.

Besides a symmetric session key, a sequence number (SN), identity resolution key (IRK), a re-config period (RP) and a listen window (LW) can be dynamically negotiated. After a successful negotiation, the MAP shares the session parameters, including the session key, SN and IRK with other anchor points in the area so that those anchor points can decrypt or authenticate messages broadcast by the mobile electronic device. The RP and LW may also be shared. The MAP may share the session parameters directly by sending them directly to other anchor points or indirectly by sending them to a positioning engine (FIG. 5) which then sends them to other anchor points. In this way, the mobile electronic device can be continuously and securely tracked while it moves within the area. The mobile device may also be continuously and securely tracked as it moves into other areas, as explained herein.

After the configuration phase is complete, the mobile electronic device enters into a broadcast mode in which it sends periodic broadcast messages. The MAP can cause the mobile electronic device to enter into this broadcast mode. In the broadcast mode, the mobile electronic device sends out periodic positioning messages which are used for indoor positioning and tracking.

These periodic broadcast messages can include a sequence number and a message authentication code (MAC) based on the negotiated session key. The negotiated sequence number can include an initial value. The sequence number for the session is then incremented after each broadcasted message. A maximum sequence number can be calculated from the RP where: Max sequency number=negotiated start sequence number+(negotiated RP/broadcast interval), where the broadcast interval is a time interval between two successive broadcast messages. Once the maximum sequence number is reached, the mobile electronic device ceases sending broadcast messages. At this point, the mobile electronic device exits broadcast mode and waits to be re-configured by a MAP. Therefore, after expiration of each RP, the mobile electronic device stops broadcasting and, instead, listens for incoming connection requests from MAPs. This listening period can be set by the value of LW. A MAP can, during this listening period, connect to the mobile electronic device and re-negotiate all the session parameters. The mobile electronic device therefore re-enters the configuration mode until it is reconfigured before returning to the broadcast mode.

The mobile electronic device can also change its device address periodically using the negotiated IRK to protect its privacy.

When a tag moves from one indoor location to another, it can be re-configured by another MAP at the new location if this MAP uses the same trusted CA as the prior MAP. By ensuring that all MAPs that may encounter the mobile electronic device trust the same CA, the mobile electronic device can move among multiple indoor locations and MAPs seamlessly. This seamless transition can occur even if the different indoor locations are not connected to the same positioning engine or backend database.

Figure 1:
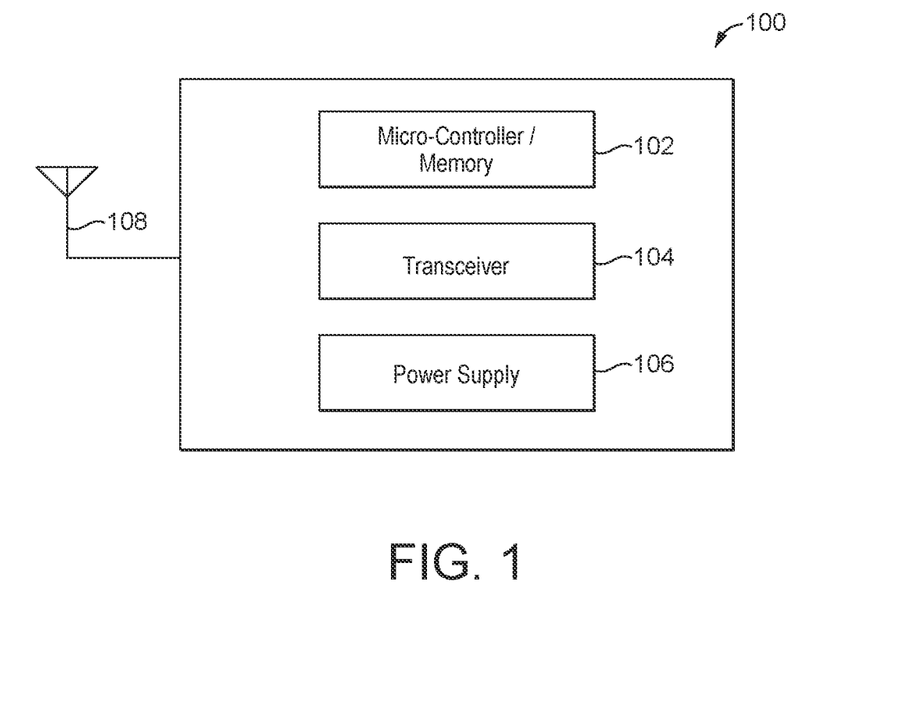
FIG. 1 illustrates a mobile electronic device (or "tag") in accordance with an embodiment of the present invention.

FIG. 1 illustrates a mobile electronic device (or "tag") 100 in accordance with an embodiment of the present invention. The mobile electronic device 100 can include: a micro-controller and associated memory 102; a wireless transceiver 104 and a power supply 106. The micro-controller 102, together with software stored in the memory, controls operation of the mobile electronic device 100. The memory can also store temporary information such as session parameters. The wireless transceiver 104 participates in two-way communications (e.g., to negotiate session parameters) and sends broadcast messages using an antenna 108. The power supply 106 provides power to the components of the mobile electronic device 100. Because the electronic device 100 is mobile (i.e. portable), the power supply 106 preferably includes a battery. This can be, for example, a coin-cell type battery though other battery types can be used.

Figure 2:
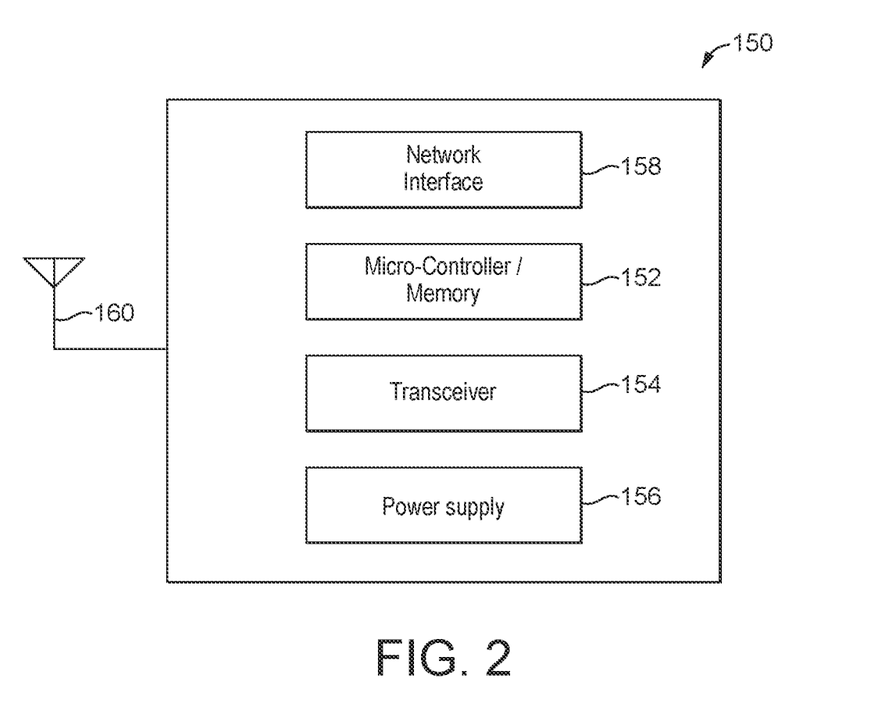
FIG. 2 illustrates a stationary electronic device (or "anchor point") in accordance with an embodiment of the present invention.

FIG. 2 illustrates a stationary electronic device (or "anchor point") 150 in accordance with an embodiment of the present invention. The stationary electronic device 150 can include: a micro-controller and associated memory 152; a wireless transceiver 154; a power supply 156; and a network interface 158. The micro-controller 152, together with software stored in the memory, controls operation of the stationary electronic device 150. The memory can also store temporary information such as session parameters. The wireless transceiver 154 participates in two-way communications (e.g., to negotiate session parameters and forward directly or indirectly session parameters to other anchor points) and receives broadcast messages from mobile electronic devices using an antenna 160. The power supply 156 provides power to the components of the stationary electronic device 150. Because the electronic device 150 is generally stationary, the power supply 156 can include an off-line power supply. The power supply 156 can additionally or alternatively include a battery. For example, a battery can provide backup power in case mains power is temporarily lost or a battery can provide exclusive power in installations where mains power is unavailable or inconvenient.

The network interface 158 can be used to communicate with a backend positioning engine for performing location tracking functions. The network interface 158 can also be used for receiving out-of-band configuration parameters and information, such as a security certificate.

The stationary electronic device 150 can be configured to function as an anchor point that is also a MAP or as an anchor point that is not a MAP. The difference between them is essentially that a MAP has an ability to participate in negotiation of session parameters with a mobile electronic device 100, whereas, an anchor point that is not a MAP does not need this functionality or can have this functionality temporarily disabled. Selected stationary electronic devices 150 in an area can be configured as MAPs while other stationary electronic device 150 in the area can be configured to as anchor points that are not a MAP. The anchor points which are not MAPs can therefore, be in a listen-only mode with respect to the tags while one or more MAPs can also connect to and re-configure the tags.

Figure 3:
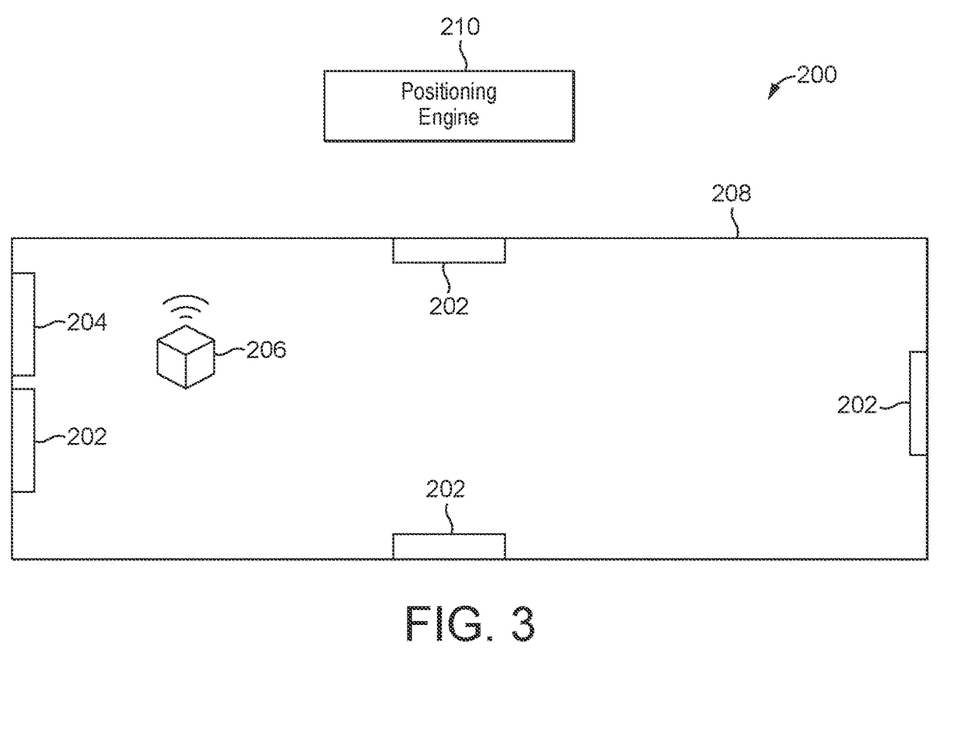
FIG. 3 illustrates a secure indoor positioning system in accordance with an embodiment of the present invention.

FIG. 3 illustrates a secure indoor positioning system 200 in accordance with an embodiment of the present invention. The system 200 includes a plurality of anchor points 202, at least one of which is a MAP 204, and a mobile electronic device (or tag) 206. The anchor points 202 and MAP 204 can be implemented by the stationary electronic device shown in FIG. 2. The tag 206 can be implemented by the mobile electronic device shown in FIG. 1. The anchor points 202 and MAP 204 are located in an area 208 that can be indoors. The area 208 can include, for example, an interior of a building or a portion of the interior of a building.

As shown in FIG. 3, the system 200 also includes a positioning engine 210. The positioning engine 210 can be implemented as a computer server or similar computing device. This means that the positioning engine 210 will generally include at least a processor, data storage (a "back-end database") and a network interface. The positioning engine 210 is communicatively coupled to the anchor points 202 and MAP 204. For example, the positioning engine 210, the anchor points 202 and MAP 204 can all be connected to one or more networks, such as the Internet, intranet, a cellular network, a Bluetooth network, or a wireless LAN. In an embodiment, the anchor points 202 and MAP 204 communicate with the positioning engine 210 using their network interfaces 158 (FIG. 2). Alternatively, the anchor points 202 and MAP 204 communicate with the positioning engine 210 using wireless communication technology, such as Bluetooth, WiFi, near-field communication (NFC) or similar technology.

The positioning engine 210 receives location information from the anchor points 202 and MAP 204 which the positioning engine 210 uses to determine and track the particular location of the mobile electronic device 206 within the area 208. Such location information can include, for example, received signal strength indicator (RSSI), angle of arrival (AoA), angle between the mobile device and the anchor point, and other timing, phase or distance information.

Figure 4:
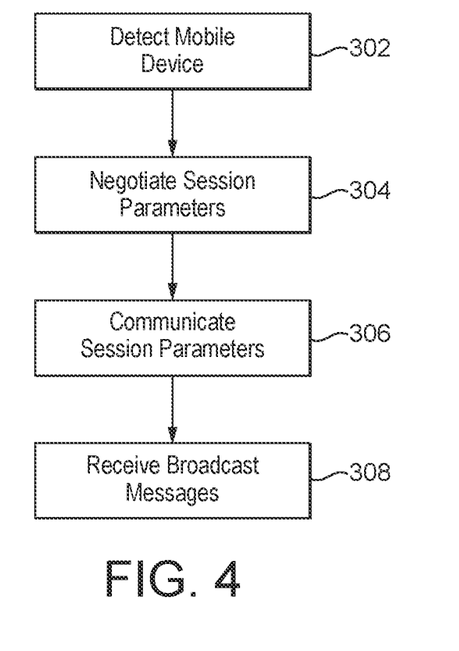
FIG. 4 illustrates a method in accordance with an embodiment of the present invention.

FIG. 4 illustrates a method 300 in accordance with an embodiment of the present invention. The method 300 can be performed, for example, by the system 200 of FIG. 3. In a step 302, the mobile electronic device 206 (FIG. 3) is detected entering into proximity of the MAP 204 (FIG. 3). In an embodiment, the MAP 204 detects the mobile electronic device 206 in this step.

In a step 304, a plurality of secure session parameters are negotiated between the MAP 206 and the mobile electronic device 206 via two-way wireless communication between the MAP 206 and the mobile electronic device 204. This communication is preferably performed via short-range wireless communication. Such short range wireless communication can be, for example, via Bluetooth, WiFi, near-field communication (NFC) or similar technology. The secure session parameters can be negotiated between the MAP 206 and the mobile electronic device 204 in step 304 using a light-weight Public Key Infrastructure (PKI) protocol.

The step 304 is preferably performed in response to the MAP 204 detecting the mobile electronic device 206 in step 302. Also in the step 304, the MAP 204 preferably puts the mobile electronic device 206 into a configuration mode. There may be at least two different mechanisms by which the tag can be returned to the configuration mode: (1) the tag has reached reconfiguration period (the parameter that was negotiated earlier)—in this case the tag automatically enters configuration mode; or (2) the tag periodically listens for incoming connection requests from a MAP (based on a previously negotiated listening window)—in this case, if a MAP wants to re-configure the tag it can connect during the specified listening interval.

The secure session parameters negotiated in step 304 can include a symmetric session key, a sequence number (SN), identity resolution key (IRK), a re-config period (RP) and a listen window (LW).

In a step 306, one or more of the plurality of secure session parameters negotiated in step 304 is communicated directly or indirectly by the MAP 204 to one or more of the other stationary electronic devices 202. Thus, after a successful session negotiation, the MAP 204 shares the session key, SN and IRK with other anchor points 202 in the area 208 so that the mobile electronic device 206 can be continuously tracked while it moves within the area 208. In an embodiment, the MAP 204 sends the secure session parameters to a positioning engine (FIG. 5) and the positioning engine forwards that information to the anchor points 202.

The MAP 204 therefore shares the session information of the newly configured tag 206 with the positioning engine 210 and other anchor points 202. When the other anchor points 202 have the configuration information they can start listening to the broadcast messages and perform tracking of the tag 206. The secure broadcast messages from the tag can now be recognized and tracked by only authorized anchor points.

In a step 308, the one or more of the plurality of stationary electronic devices (which can include the anchor points 202 and the MAP 204) receive secure messages broadcasted by the mobile electronic device 206. These messages are decrypted or authenticated using one or more of the negotiated secure session parameters (for example, the secure session key). These messages can be used to determine a position of the mobile electronic device 206 within the area 208.

After the key negotiation, the tag enters into broadcast mode. For sending the broadcast messages, the MAP 204 may cause the mobile electronic device 206 to enter into a broadcast mode. In an embodiment, once the security parameters are negotiated successfully and the MAP 204 disconnects from the device 206, the device 206 enters broadcast mode. These broadcast messages are sent periodically by the mobile electronic device while it remains in the broadcast mode. The messages are received by the anchor points 202 and/or the MAP 204, which then send location information to the positioning engine 210 (FIG. 3) which the positioning engine 210 uses to determine and track the particular location of the mobile electronic device 206 as it moves within the area 208. In broadcast mode, the tag listens for re-configuration requests periodically.

The mobile device 206 can be a constrained node, in which case, the device may communicate with one or more of the anchor points 202 and/or the MAP 204 using a constrained wireless protocol. As used herein, "constrained node" refers a node where at least some of the characteristics of typical Internet nodes (e.g., desktop, laptop or tablet computers, or powerful mobile devices such as smartphones) are not present, often due to physical constraints on characteristics such as size, weight, and available energy and power and/or cost constraints. Due to their constraints, constrained nodes may communicate using a constrained wireless protocol. As used in herein, "constrained wireless protocol" refers to a wireless communication protocol having a protocol stack that is specifically designed for constrained nodes (e.g., the Constrained Application Protocol (CoAP) over User Datagram Protocol (UDP)) and that employs less than a full protocol stack such as that of HTTP, Transport Layer Security (TLS), and related security protocols.

Figure 5:
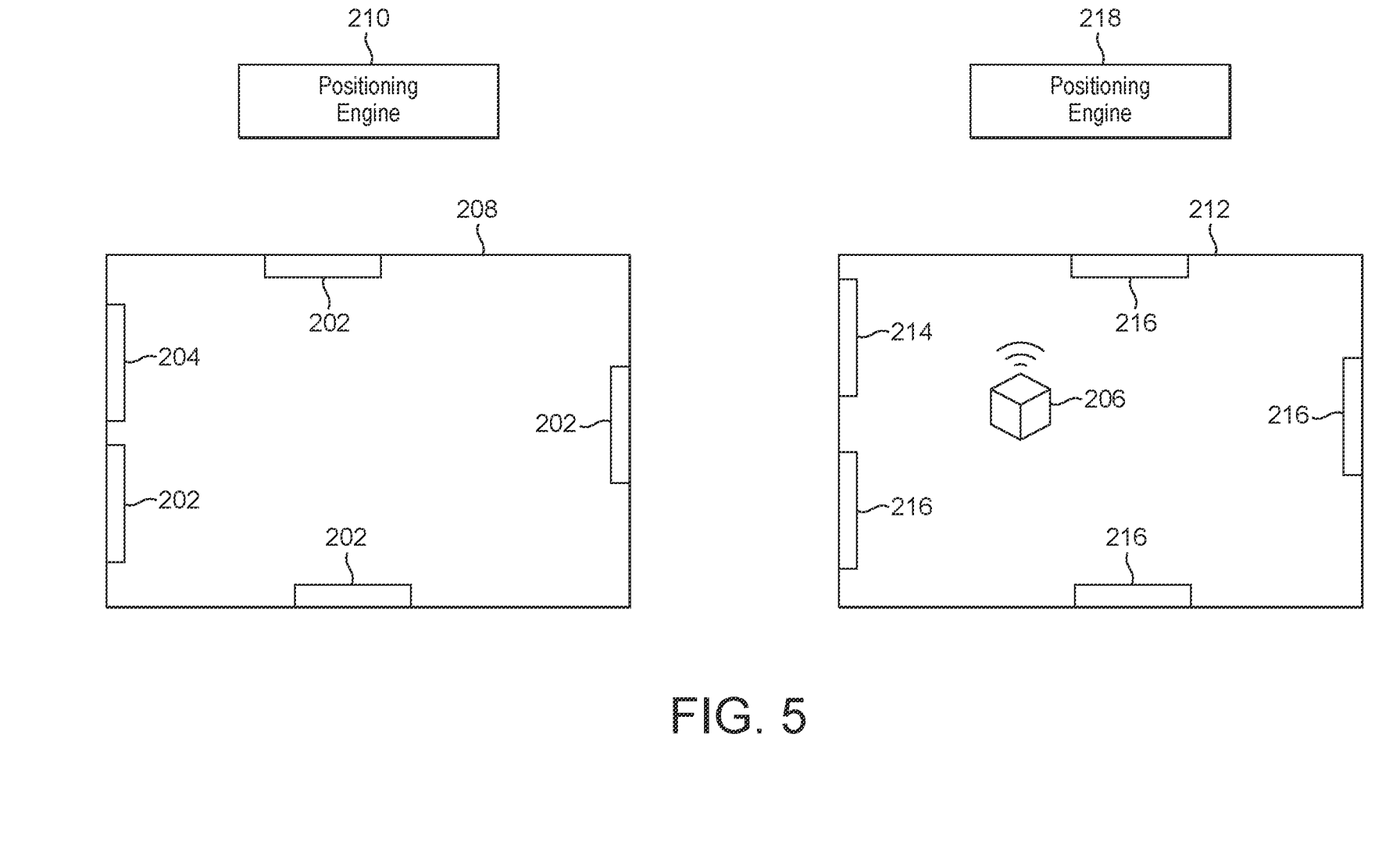
FIG. 5 illustrates a mobile electronic device moving among different indoor areas in accordance with an embodiment of the present invention.

FIG. 5 illustrates a mobile electronic device moving among different indoor areas in accordance with an embodiment of the present invention. More particularly, FIG. 5 shows the mobile electronic device 206 has left the area 208 and entered a different area 212. For example, the two areas 208 and 212 can represent two different floors within the same building or two different buildings within a collection of buildings (e.g., they may be different buildings within a campus). A MAP 214 within the area 212 detects the presence of the mobile electronic device 206 within the vicinity of the MAP 214 and negotiates new session parameters with the mobile electronic device 206. These new session parameters may then be shared with other anchor points 216. These anchor points 216 and the MAP 214 receive broadcast messages from the mobile electronic device 206.

In an embodiment, the anchor points 216 and the MAP 214 then send location information to the positioning engine 210. In this case, multiple areas 208 and 212 share the same positioning engine 210. However, this is not necessary. Thus, in an embodiment, the positioning engine 210 is associated with the area 208 but a different positioning engine 218 is associated with the area 212. In this case, the anchor points 216 and the MAP 214 send location information to the positioning engine 218. For example, a tag can be tracked in Athens International Airport which may be represented by area 208 in FIG. 5. Stockholm-Arlanda Airport (ARN) may be represented by area 212 in FIG. 5. Once the tag reaches ARN, it will be tracked again. In this case, the two areas 208 and 212 (and the two airports) can share the same CA, e.g., because they follow EU regulations. However, the two areas 208 and 212 do not need to share the same positioning engine and backend database.

In this way, the mobile electronic device 206 may be tracked within the area 212 in the same way that the mobile electronic device 206 was tracked within the area 208. Accordingly, the tag can move seamlessly from one indoor location to another without requiring any internet connectivity.

The techniques described herein provide for the simultaneous tracking of multiple different mobile electronic devices in one or more areas. Additionally, these multiple different mobile electronic devices can move seamlessly from one area to another while still be tracked.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method comprising:
   detecting a mobile electronic device entering into proximity of a stationary electronic device;
   negotiating, in response to said detecting, a plurality of secure session parameters via two-way wireless communication between the stationary electronic device and the mobile electronic device using a light-weight key negotiation protocol;
   communicating one or more of the negotiated plurality of secure session parameters to one or more other stationary electronic devices, the stationary electronic device and the one or more other stationary electronic devices collectively being a plurality of stationary electronic devices; and
   receiving, at one or more of the plurality of stationary electronic devices, secure messages broadcasted by the mobile electronic device, said messages being decrypted or authenticated using one or more of the negotiated secure session parameters and said messages being used to determine a position of the mobile electronic device.

2. The method according to claim 1, wherein the plurality of secure session parameters comprises: a security key, a sequence number, an identity resolution key, a reconfiguration period, and a listen window.

3. The method according to claim 1, wherein said negotiating the plurality of secure session parameters is performed while the mobile electronic device is in a configuration mode and said receiving secure messages is performed while the mobile electronic device is in a broadcast mode, wherein a duration of the broadcast mode is determined during the configuration mode.

4. The method according to claim 3, wherein the configuration mode is re-entered by the mobile electronic device upon expiration of the broadcast mode and further comprising negotiating a plurality of new secure session parameters upon re-entry into the configuration mode.

5. The method according to claim 1, wherein the mobile electronic device comprises a constrained node and wherein the mobile electronic device communicates with one or more of the plurality of stationary electronic devices via a constrained wireless protocol.

6. The method according to claim 1, wherein the two-way wireless communication used for said negotiating is performed using short range radio waves and wherein the mobile electronic device broadcasts the secure messages using short range radio waves and wherein the secure messages are usable to determine a position of the mobile electronic device by analyzing the radio waves received at one or more of the stationary electronic devices of the plurality of stationary electronic devices.

7. The method according to claim 1, further comprising:
   detecting the mobile electronic device entering into proximity of a stationary electronic device of a second plurality of stationary electronic devices; and
   negotiating, in response to said detecting, new secure session parameters via two-way wireless communication between the stationary electronic device of the second plurality of stationary electronic devices and the mobile electronic device,
   wherein said negotiating the plurality of secure session parameters and said negotiating the new secure session parameters are both performed using a same certificate authority.

8. The method according to claim 1, wherein the mobile electronic device and the stationary electronic device are each preconfigured with an asymmetric private key or a shared symmetric key.

9. A system comprising:
a plurality of stationary electronic devices, at least one of the stationary electronic devices being configured to detect a mobile electronic device entering into proximity of the stationary electronic device and, in response to said detection, to negotiate a plurality of secure session parameters via two-way wireless communication between the stationary electronic device and the mobile electronic device using a light-weight key negotiation protocol, and the at least one of the stationary devices being configured to communicate one or more of the negotiated plurality of secure session parameters to one or more other stationary electronic devices of the plurality of stationary electronic devices, and each of the plurality of stationary electronic devices being configured to receive secure messages broadcasted by the mobile electronic device, said messages being decrypted or authenticated using one or more of the negotiated secure session parameters and the messages being usable to determine a position of the mobile electronic device.

10. The system according to claim 9, wherein the plurality of secure session parameters comprises: a security key, a sequence number, an identity resolution key, a reconfiguration period, and a listen window.

11. The system according to claim 9, wherein the plurality of secure session parameters are negotiated during a configuration mode of the mobile electronic device and wherein the mobile electronic device periodically broadcasts the secure messages during a broadcast mode of the mobile electronic device, and wherein a duration of the broadcast mode is determined during the configuration mode.

12. The system according to claim 11, wherein the configuration mode is re-entered upon expiration of the broadcast mode and wherein a plurality of new secure session parameters are negotiated upon re-entry into the configuration mode.

13. The system according to claim 9, wherein the mobile electronic device comprises a constrained node and wherein the mobile electronic device communicates with one or more of the plurality of stationary electronic devices via a constrained wireless protocol.

14. The system according to claim 9, wherein the two-way wireless communication used for said negotiating is performed using short range radio waves and wherein the mobile electronic device broadcasts the secure messages using short range radio waves and wherein the secure messages are usable to determine a position of the mobile electronic device by analyzing the radio waves received at one or more of the stationary electronic devices of the plurality of stationary electronic devices.

15. The system according to claim 9, wherein the system further comprises a second plurality of stationary electronic devices, at least one of the stationary electronic devices of the second plurality of stationary electronic devices being configured to detect the mobile electronic device entering into proximity of the stationary electronic device of the second plurality of stationary electronic devices and, in response to said detection, to negotiate new secure session parameters via two-way wireless communication between the stationary electronic device of the second plurality of stationary electronic devices and the mobile electronic device, wherein the plurality of secure session parameters and the new secure session parameters are both negotiated using a same certificate authority.

16. The system according to claim 9, wherein the mobile electronic device and the stationary electronic device are each preconfigured with an asymmetric private key or a shared symmetric key.

17. A mobile electronic device comprising:
data storage configured to store a plurality of secure session parameters; and
a processor configured to listen for connection requests from one or more of a plurality of stationary electronic devices and the processor further configured to, in response to receiving a connection request, negotiate the plurality of secure session parameters via two-way wireless communication between the mobile electronic device and the one or more of the plurality of stationary electronic devices using a light-weight key negotiation protocol, and the processor being further configured to broadcast secure location messages capable of being decrypted or authenticated using one or more of the negotiated secure session parameters and the messages being usable to determine a position of the mobile electronic device.

18. The mobile electronic device according to claim 17, wherein the plurality of secure session parameters comprises: a security key, a sequence number, an identity resolution key, a reconfiguration period, and a listen window.

19. The mobile electronic device according to claim 17, wherein the plurality of secure session parameters are negotiated during a configuration mode of the mobile electronic device and wherein the mobile electronic device periodically broadcasts the secure messages during a broadcast mode of the mobile electronic device, and wherein a duration of the broadcast mode is determined during the configuration mode.

20. The mobile electronic device according to claim 19, wherein the configuration mode is re-entered upon expiration of the broadcast mode and wherein a plurality of new secure session parameters are negotiated upon re-entry into the configuration mode.

21. The mobile electronic device according to claim 17, wherein the mobile electronic device comprises a constrained node and wherein the mobile electronic device communicates with one or more of the plurality of stationary electronic devices via a constrained wireless protocol.

22. The mobile electronic device according to claim 17, wherein the two-way wireless communication used for said negotiating is performed using short range radio waves and wherein the mobile electronic device broadcasts the secure messages using short range radio waves and wherein the secure messages are usable to determine a position of the mobile electronic device by analyzing the radio waves received at one or more of the stationary electronic devices of the plurality of stationary electronic devices.

23. The mobile electronic device according to claim 17, wherein the processor is further configured to listen for connection requests from a second plurality of stationary electronic devices and to negotiate new secure session parameters via two-way wireless communication between at least one of the stationary electronic devices of the second plurality of stationary electronic devices, wherein the plurality of secure session parameters and the new secure session parameters are both negotiated using a same certificate authority.

24. The mobile electronic device according to claim 17, wherein the mobile electronic device is preconfigured with an asymmetric private key or a shared symmetric key.

\* \* \* \* \*